March 22, 1938.   E. W. KOCH   2,111,972

PHOTOGRAPHIC VIEW FINDER

Filed Jan. 11, 1937

INVENTOR:
EDWIN W. KOCH,
BY: Christian A. Nielsen
ATTORNEY

Patented Mar. 22, 1938

2,111,972

UNITED STATES PATENT OFFICE 2,111,972

PHOTOGRAPHIC VIEW FINDER

Edwin W. Koch, Tremont, Ill.

Application January 11, 1937, Serial No. 120,086

2 Claims. (Cl. 88—1.5)

The present invention contemplates an improvement in camera view-finders, for use principally on the small folding type camera, and has as its primary object, the construction of a simple, dependable finder having independent image screens respectively, adapted for vertical and horizontal exposures, so that in each instance, only such objects can be reflected upon the screen as will actually appear in the negative.

At the present time, cameras adapted for taking pictures in both the horizontal and vertical positions, must either be equipped with two view-finders, one for each position, or as is generally the case with the ordinary folding camera, a single two-way view finder which is movable or reversible, and which must be properly aligned on the camera frame when changing from one position to the other. In actual practice, if this alignment is not properly made, and the scene not very carefully observed through the image screen, the negative will not produce the view as seen through the view-finder, as the single screen used for locating scenes in either position, necessitates the drawing of imaginary lines across the top and bottom sides of the glass when taking horizontal pictures, and on the right and left hand sides when taking them vertically. Such is oftentimes confusing, and frequently when taking pictures with the reversible view-finder, parts of the scene desired are partially cut off or sometimes do not show at all, while other scenes not intended to be included are exposed on the negative.

It is therefore the object of the present invention to provide a simplified view-finder device which will facilitate the taking of pictures with an ordinary folding camera in either the vertical or horizontal position, without requiring a moving or reversing of the view-finder, and without requiring the drawing of imaginary lines, designed to show the exact field covered by the camera lens at all times. To this end, the invention includes an oscillatable reflecting mirror.

The invention has as a further object to provide an improved practical type of reflecting mirror, smooth in operation, non-cumbersome, of a one-piece construction, especially designed to oscillate in a restricted area, and to also provide in connection therewith a stop for automatically arresting the mirror in aligned position underneath the respective image screen.

Another object of the invention is to provide a simple improved mounting for the mirror and for pivotally supporting it in position, and in connection therewith a brake spring disposed on the single supporting axis for yieldably retaining the mirror in any adjusted position, eliminating chances for accidental movement from any fixed position.

A still further object of the invention is to provide a casing for a bias cut mirror providing rotation of the mirror in a restricted area thereby making it especially adaptable for use with small folding cameras.

A still further object of the invention is the provision of a mirror of one piece construction embodying bias cut corners, a single rearwardly disposed supporting axis, and a casing for housing the mirror, the latter having a bevelled edge permitting ready oscillation of the mirror as well as allowing the casing to fit much closer to the bellows of a camera than has been possible heretofore.

The invention together with its numerous objects and advantages will be best understood from a study of the following description considered in conjunction with the accompanying drawing, wherein is illustrated the preferred embodiment of the invention.

It is to be understood at the outset that it is in no wise intended to restrict the invention to the precise details of construction, combination or arrangement of elements as herein illustrated and described, other than may be necessary to meet the requirements of the prior art and scope of the appended claims.

In the drawing:—

Figure 1:
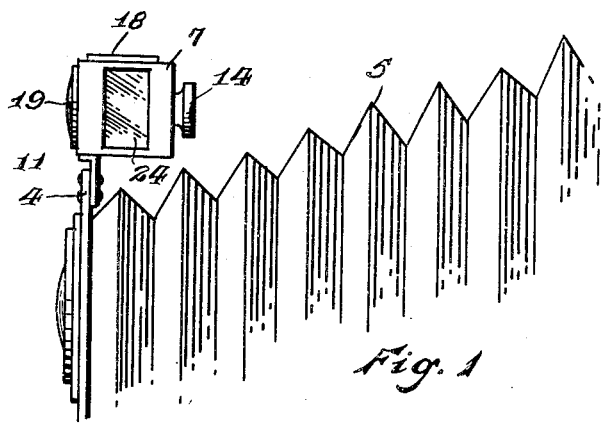
Figure 1 is a fragmentary side elevational view illustrating the application of the view-finder to a small folding camera.

For convenience, I have illustrated in Figure 1 my improved view-finder in connection with a folding camera 5, having a lens board 4, the finder being mounted upon said board on one corner thereof by means of the bracket 11.

Figure 2:
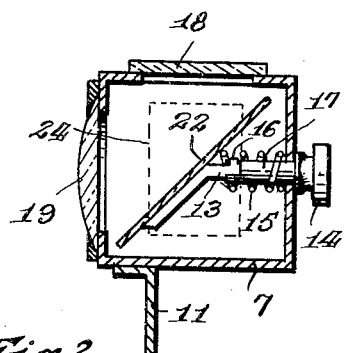
Figure 2 is a cross sectional view of the view-finder casing with the oscillating mirror mounted therein, for more clearly illustrating the working principles of the invention.

More particularly, it will be seen from Figure 2 that the view-finder as therein illustrated comprises a substantially square shaped box-like casing 7, having one corner thereof bevelled or cut away as indicated at 9. The top side of the casing is provided with an opening 18 which is of a square or rectangular configuration, while one adjoining side of the casing is provided with a similar opening 24, both said openings being used to observe images being reflected from the swinging mirror 22 located underneath. In the front wall of the casing 7 is a circular opening 19 provided for the view-finder lens.

Figure 4:
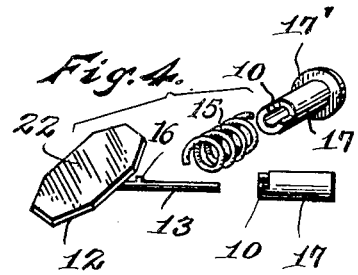
Figure 4 is a perspective view of the one-piece single axis reflecting mirror with bias cut corners, and several types of tubular supports through which it passes and wherein it oscillates.
Figure 5:
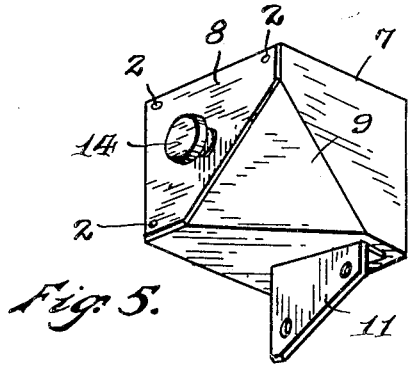
Figure 5 is a perspective view of the view-finder assembled.

Revolubly mounted within the casing 7 is a rectangularly shaped reflecting mirror 22, the corners of which are cut on a diagonal line 12 as shown in Figure 4, to permit rotation of the mirror in the smallest possible confined area. The mirror 22 is arranged and revolves within the casing at an angle of approximately forty-five degrees, and is solidly attached to one end of the shaft 13. The shaft 13 passes through the tubular bearing support 17 fixed in the casing wherein it rotates, serving as an axis for the mirror which can be manipulated from one image screen to the other by means of the knob control 14.

The coil spring 15 is so arranged upon the shaft 13 as to yieldingly retain the mirror in any adjusted position. The nib 16 located on the shaft 13 fits and turns in the quarter-round cut-away section 10 of the tubular support 17, acting as a stop for the mirror and preventing it from turning past the aligned position beneath the image screens 18 and 24.

Figure 3:
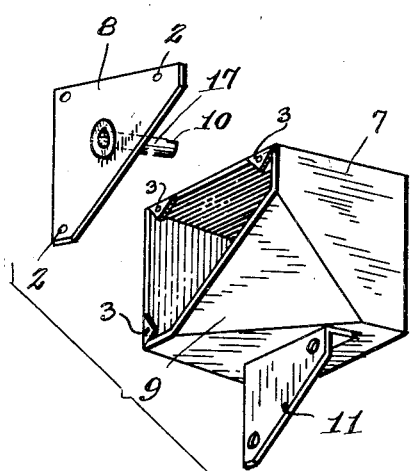
Figure 3 is a perspective view of the box portion of the view-finder showing the back cover of the box detached, with one type of tubular support which may be used, securely attached to the cover, and also illustrating the cut-away portion of the casing.

In Figure 3 there is illustrated the removable back cover 8 with the tubular support 17 attached. The cover 8 is fastened to the casing 7 by means of the small screws 2, or by small projecting clamps (not shown) which fold over the cover and hold it in place. The small screws 2 are screwed into the threaded holes of the tabs 3.

It should be noted that the tubular support is integral with the rear wall or cover 8 and provides ample bearing for the shaft 13 of little friction and reduces wear to a minimum. The support 17 may include a collar 17' or not, as desired, or found most expedient in manufacture and assembly.

From the structure shown and described, it will be apparent that by rotating the shaft 13, by means of the knob 14, the mirror 22 will be moved from alignment with one view opening to the other with assurance of being properly positioned, since the nib 16 will engage the side walls of the slot 10, thereby stopping further movement.

By provision of a casing having a cutaway portion 9, the device may be readily mounted upon small folding cameras, making it more compact and without in any way interfering with closing of the camera; and the mirror 22 having corners 12 cut on a bias permits ready oscillation of the mirror within a casing of comparatively small area, such casing being hardly larger than the width of the mirror itself, instead of twice its width as would be required if the corners were not so formed.

I claim:—

1. A device of the character described comprising a casing having means for mounting upon a camera, said casing having a view-finder lens, a pair of walls of the casing each having a view opening formed therein, said openings being disposed at right angles to each other, a sleeve bearing member in the back wall of the casing, positioned approximately midway of the height of the casing, said sleeve having a notch formed upon the inner end thereof and of a length extending approximately one quarter of the circumference of the sleeve, a shaft journalled in the sleeve, a mirror on the shaft and positioned within the casing, said mirror being disposed at an angle of approximately 45 degrees for registry with the view finder lens and alternately with respective view openings, a nib on the shaft positioned within the notch, a helical spring on the sleeve interposed between a wall of the casing and in bearing contact with the mirror for tensioning the shaft, and means on the shaft exterior of the casing for actuating the shaft.

2. A device of the character described comprising a casing having means for mounting upon a folding camera, said casing having a view-finder lens, a pair of walls of the casing each having a view opening formed therein, said openings being disposed at right angles to each other, a removable back wall for the casing, a sleeve member rigidly fixed in the wall and positioned approximately midway of the height of the casing, said sleeve having a notch formed upon the inner end thereof and of a length extending approximately one-quarter of the circumference of the sleeve, a shaft journalled in the sleeve, a nib on the shaft and positioned within the notch, a mirror on the end of the shaft and positioned within the casing, said mirror being disposed at an angle of approximately 45 degrees for registry with the view finder lens and alternately with respective view openings, and having bias cut corners, a helical spring member on the sleeve interposed between the back wall and the mirror for tensioning the shaft and maintaining the mirror in adjusted position, means on the shaft exterior of the casing for actuating the shaft, and said casing having a bevelled corner for accommodation of the casing within the walls of a folding camera.

EDWIN W. KOCH.